Feb. 3, 1970 A. J. SCALZO ET AL 3,493,212
ROTARY MACHINE APPARATUS
Filed June 24, 1968 3 Sheets-Sheet 1
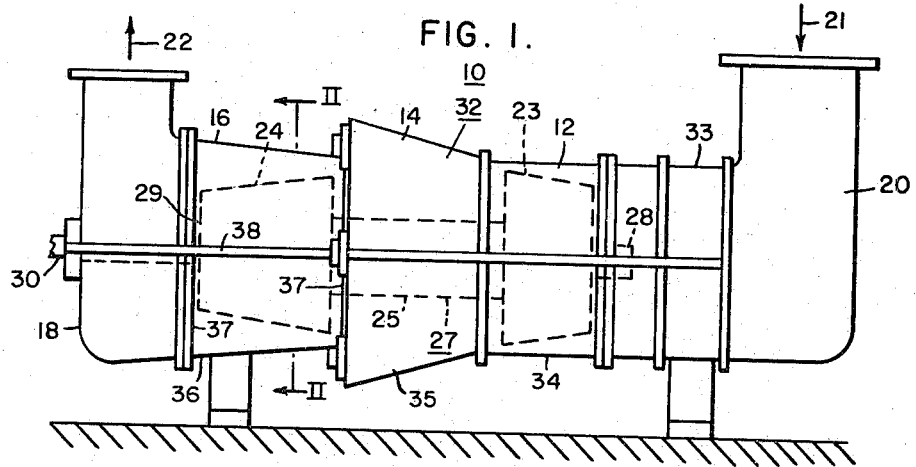
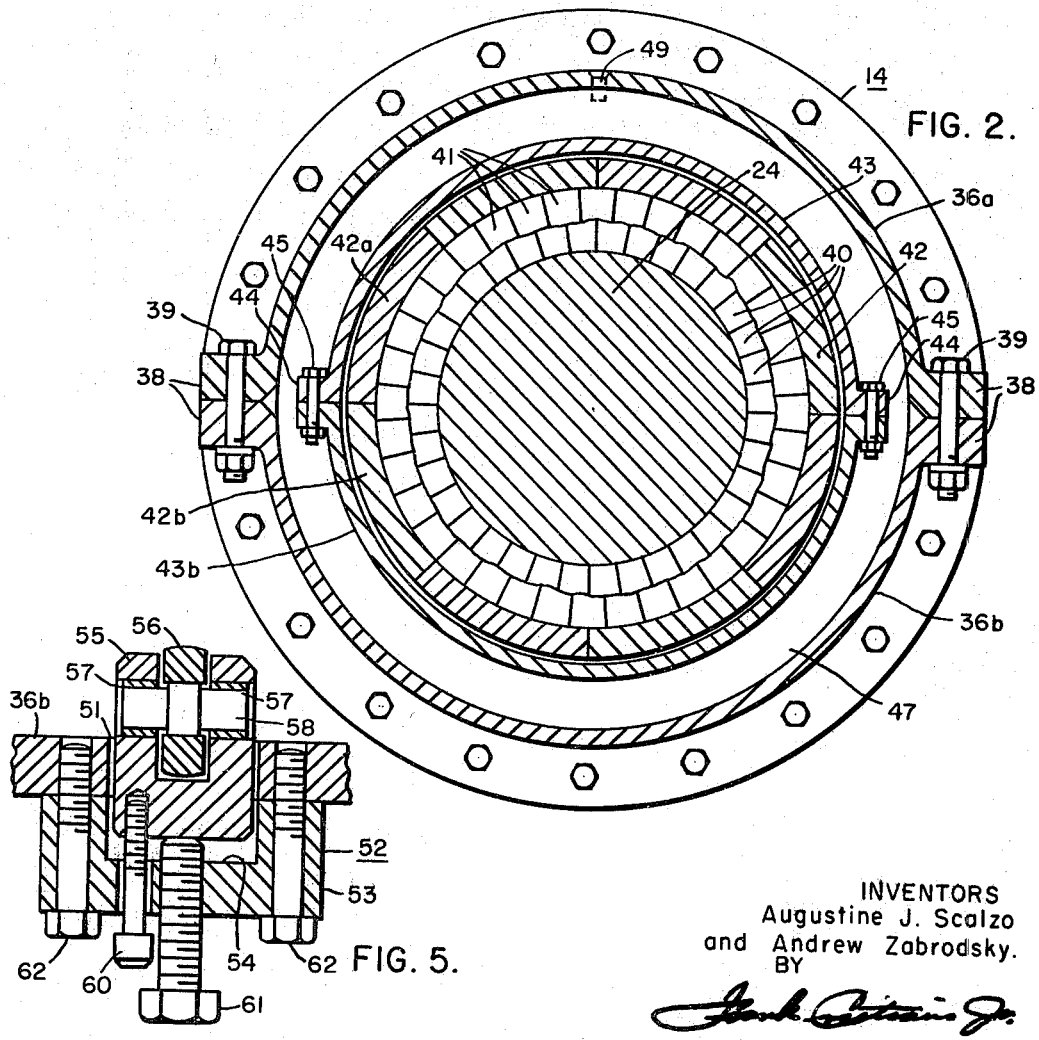
INVENTORS
Augustine J. Scalzo
and Andrew Zabrodsky.
BY

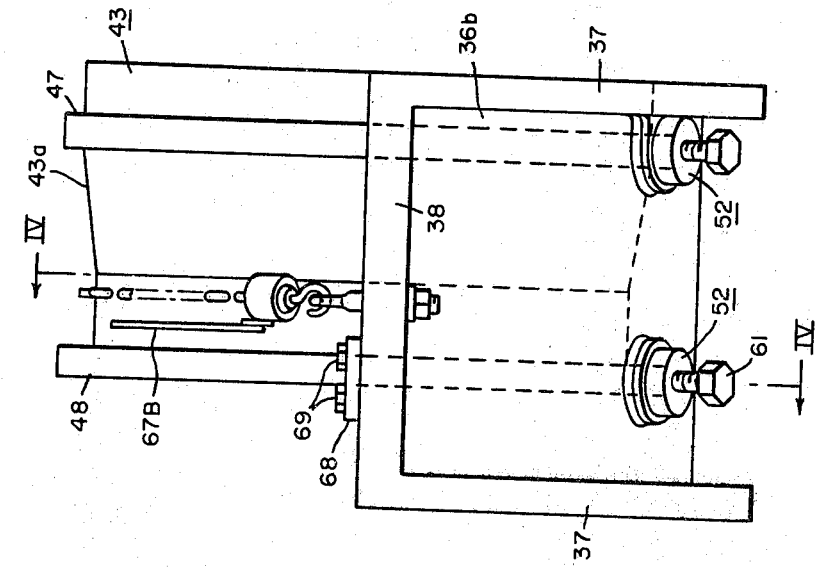
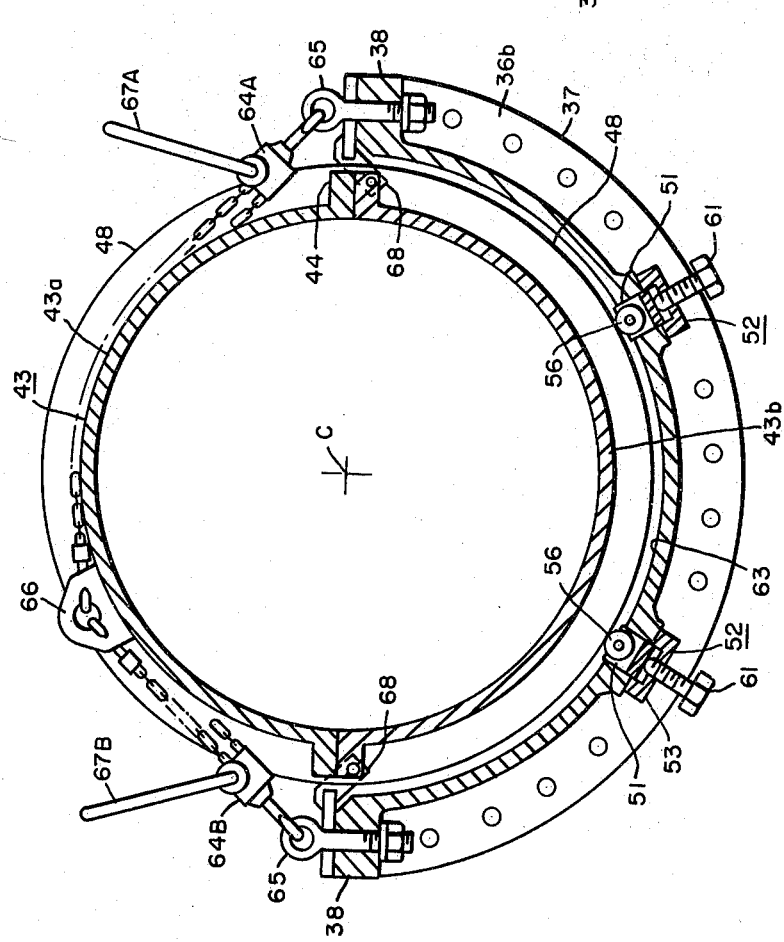

Feb. 3, 1970  A. J. SCALZO ET AL  3,493,212
ROTARY MACHINE APPARATUS
Filed June 24, 1968  3 Sheets-Sheet 3

United States Patent Office 3,493,212
Patented Feb. 3, 1970

---

3,493,212
ROTARY MACHINE APPARATUS
Augustine J. Scalzo, Philadelphia, and Andrew Zabrodsky, Boothwyn, Pa., assignors to Westinghouse Electric Corporation, Pittsburgh, Pa., a corporation of Pennsylvania
Filed June 24, 1968, Ser. No. 739,474
Int. Cl. F01d 1/00; F04d 29/00
U.S. Cl. 415—127
17 Claims

ABSTRACT OF THE DISCLOSURE

The invention relates to a machine, such as a turbine or compressor, having inner and outer tubular casings encompassing the rotor and divided along a horizontal plane into upper and lower semi-cylindrical halves. The improvement lies in the provision of means for rollably supporting the inner casing in the lower half of the outer casing, so that, during servicing, after the upper half of the outer casing is removed, the lower half of the inner casing may be readily rolled out of the lower half of the outer casing without the necessity of removing the rotor. The rollable support means are brought to bear against the outer cylindrical surface of the lower half of the inner casing to permit removal, and at other times are either retracted or removed so that in normal operation the inner casing is immovably supported by the outer casing.

BACKGROUND OF THE INVENTION

Axial flow turbines and compressors are typically provided with an inner casing that contain the rows of stationary nozzles for directing the motive fluid past the rotor blading, and the inner casing is disposed within an outer casing structure for many well known reasons.

Since such machines must be disassembled from time-to-time for servicing and/or repair, the inner and outer casings are divided into upper and lower halves that are removably joined to each other at suitable horizontal flanges, by bolts. The nozzle rows are also divided into upper and lower semi-circular halves, so that they may be removed with the associated inner casing half as a unit and then removed from the casing for repair or replacement, it required.

Although the upper half of the inner casing is readily accessible for removal by first removing the upper half of the outer casing, the lower half of the inner casing has heretofore not been so easily removable, since the rotor is supported in the lower half of the outer casing and interferes with such removal.

THE INVENTION

Briefly, in accordance with the invention, there is provided an arrangement which permits ready removal of the lower half of the inner casing, together with the lower halves of the stationary nozzle rows, without removal of the rotor. The above is attained by providing a roller structure insertable in the lower outer casing and extending into rollable supporting relation with the inner casing, thereby to permit the inner casing to be rolled about its central longitudinal axis to an uppermost position in which it is free of the rotor, at which time it may readily be lifted clear of the outer lower half casing for service and repair.

In one embodiment, the roller structure includes a pair of rollers displaced about 30° from the vertical centerline of the casing structure and means to jack the rollers in radial direction until they exert a lifting force on the inner casing and space it from the outer casing to a slight degree sufficient to eliminate dragging thereon.

In another embodiment, the roller structure includes a chain-like series of connected rollers insertable between the lower halves of the inner and outer casings, so that the inner lower casing half is freely rotatable in the outer casing and thus rendered removable.

BRIEF DESCRIPTION OF THE DRAWINGS

FIGURE 1 is a side elevational view of an axial flow gas turbine power plant having the invention incorporated therein;

FIG. 2 is a transverse sectional view on a much larger scale, taken on line II—II of FIG. 1;

FIG. 3 is a side elevational view of a portion of the structure shown in FIG. 1, on the same scale as FIG. 2, with the upper half of the outer housing removed;

FIG. 4 is a transverse sectional view taken on line IV—IV of FIG. 3, showing only the inner and outer casing structure;

FIG. 5 is an enlarged detailed sectional view of one of the roller structures shown in FIG. 4;

Figure 6:
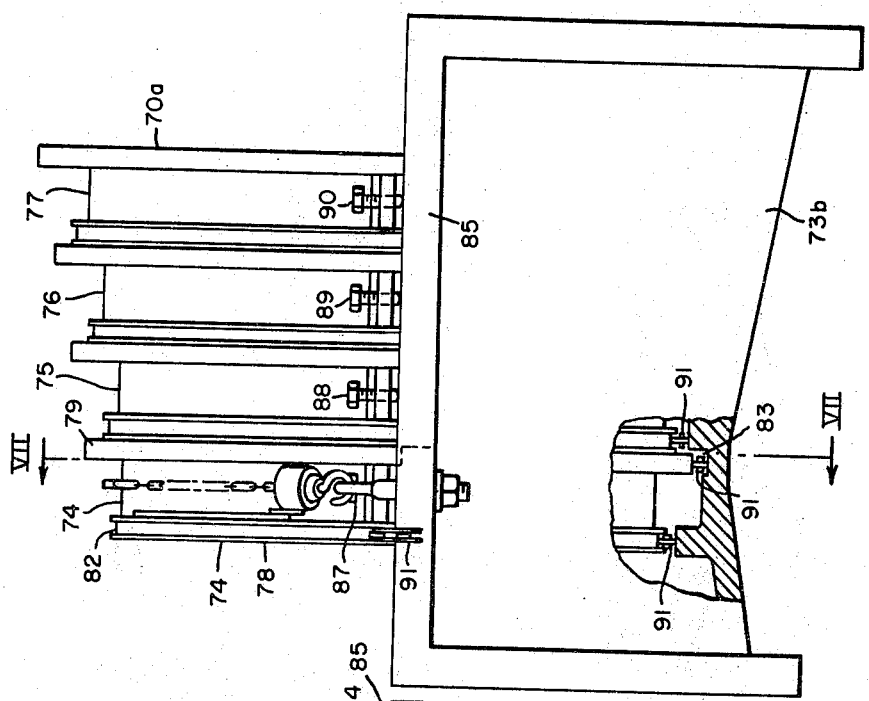
FIG. 6 is a view similar to FIG. 3, but showing another embodiment of the invention.

Referring to the drawings in detail, in FIG. 1, there is shown a gas turbine power plant or machine 10 of the axial flow type having the invention embodied therein. As well known in the art, this machine includes an air compressor section 12, a fuel combustion section 14, a turbine section 16 and an exhaust hood 18. An air inlet casing 20 is provided for directing air to the compressor section 12, as indicated by the arrow 21, and the exhaust 18 is provided for directing the spent combustion gases to atmosphere, as indicated by the arrow 22. The compressor section 12 includes a compressor rotor structure 23 and the turbine section 16 includes a turbine rotor structure 24. The compressor rotor structure 23 is drivenly connected to the turbine rotor structure 24 by a connecting shaft 25, and the two rotor structures and connecting shaft 25 form a rotor spindle aggregate 27. The rotor spindle 27 is rotatably supported by suitable bearings 28 and 29 at each end.

Gas turbine power plants of this type are so well known in the art that their method of operation need not be described. However, it may be pointed out that the rotor spindle 27 may be connected to an output shaft 30 for transmitting useful shaft power for driving a load (not shown).

As illustrated in FIG. 1, the entire machine is enclosed in an outer casing structure 32 comprising inlet casing 33, a compressor casing 34, a combustion casing 35 and a turbine casing 36. The above casings are joined to each other and to the inlet casing 20 and the exhaust hood 18 by suitable bolted peripheral external flanges and are divided into upper and lower casing halves in a horizontal plane coinciding with the central longitudinal axis of the rotor spindle 27, the upper and lower casing halves being joined to each other by suitable bolted horizontal flanges, for expediency in manufacture, assembly and disassembly for service, as known in the art.

It will be appreciated that in order to remove the rotor spindle 27, all of the upper halves of the outer casings 34, 35, 36 (and possibly of casings 33 and 18) must be removed to render the spindle 27 accessible. This involves a considerable expenditure of time and effort, but, more importantly repositioning of the spindle after removal is a difficult and fastidious job, since to restore it to its original rotative position and concentricity limits requires highly skilled mechanics with costly tools and equipment.

In view of the above, it is not desirable to remove the spindle unless it is absolutely necessary and unavoidable.

In normal maintenance and service, it is, however, necessary from time to time to gain access to the internal structure of the turbine section 16 for repair or replacement of internal parts. FIG. 2 is a transverse sectional view of the turbine section 16 and, as illustrated, the outer turbine casing 36 is provided with suitable peripheral flanges 37 for connection to the adjacent casings 18 and 35 (FIG. 1). The turbine casing is also divided into upper and lower halves 36a and 36b along a central horizontal plane and joined to each other along horizontal external flanges 38 by suitable bolts 39.

The turbine rotor 24 is provided with one or more annular rows of radially extending blades 40 extending past and cooperatively associated with a like number of annular rows of stationary nozzle blades 41.

The stationary nozzle blades 41 are carried by suitable outer shroud rings 42 received in a tubular inner "blade ring" or casing 43. The shroud rings 42 are divided into upper and lower halves 42a and 42b, and in a like manner, the inner casing 43 is divided into upper and lower halves 43a and 43b and joined together along horizontal flanges 44 by suitable bolts 45.

The inner casing 43 is maintained in concentric spaced relation with the outer casing 36 by a plurality of outwardly extending peripheral flanges 47 and 48 (FIGS. 2 and 3) and keyed thereto by a suitable dowel pin 49.

As thus far described, the turbine structure is substantially conventional, and for service and repair the upper half of the outer turbine casing 36a can be readily removed by removing the bolts 39 that join the horizontal flanges 38, and by removing the bolts that join the peripheral flanges 37 to the adjacent casing structure 35 and 18. Access is thus gained to the upper half of the inner turbine casing 43a which can then be removed by removing the bolts 45 that join the horizontal flanges.

Since the nozzle blades 41 and the shroud rings 42a in the upper half of the inner casing 43a are carried thereby, they may be removed as a unit and then readily replaced or repaired as required, as known in the art.

However, the lower half of the inner casing 43b and its associated nozzle blades 41 and shroud rings 42b cannot be so readily removed, since the turbine rotor 24 extends thereacross and blocks such ready removal. Heretofore, to remove the lower inner casing half 43b and/or its nozzle blades 41, it has been necessary to remove at least the turbine rotor 24 by uncoupling it from the connecting shaft 25 and detaching it from its support bearing structure 29. In some cases, it has even been found necessary to remove the entire spindle aggregate 27. In either event, removal of one or more of the upper halves of the associated outer casings 34, 35 and 18 has been required, to permit access to the nozzle blades 41 in the lower half of the inner casing 43b. Obviously, the above involves considerable time and effort and reassembly requires even more time consuming and painstaking effort, since clearances, concentricity and other factors are involved to restore the unit to its original factory adjusted condition and to insure proper running condition without rubbing or even destruction of vital components.

In accordance with the first embodiment of this invention, the inner and outer turbine casing structure 43 and 36 respectively, is formed and arranged as shown in FIGS. 3 and 4. FIG. 3 is similar to FIG. 2 (previously described) but omits the turbine rotor 24 and its associated blades 40 and the stationary nozzle blades 41 and their associated retaining shrouds 42, for clarity. FIG. 4 also omits the internal structure deleted in FIG. 3, and in addition omits the adjacent exhaust casing structure 18 and the combustion casing structure 35 shown in FIG. 1, for clarity. In addition FIGS. 3 and 4 are views with the upper outer turbine casing half 36a removed and in readiness for removal of the inner casing 43, in accordance with the invention.

The lower outer turbine casing half 36b is provided with two apertures 51 disposed in radial alignment with the flange 48 on the inner casing 43. The apertures 51 are angularly displaced with the vertical centerline passing through the center C of the inner casing 43, for example on the order of about 30°. However, this angle is not critical and may be considerably greater or less, as desired.

A roller structure 52 for insertion in each aperture 51 is provided for attachment to the lower outer casing half 36b. As best shown in the enlarged detail view in FIG. 5, the roller structure 52 includes a mounting plate 53 of cup-shape having a central cavity 54. The cavity 54 is of about the same diameter as that of the mating aperture 51 in the turbine casing half 36b and has received therein a cylindrical block 55. The cylindrical block carries a roller 56 suitably supported therein for rotation by a journal 57 and journal bearings 58. The block 55 is held captive in the cavity 54 and guided for longitudinal movement but restrained against rotative movement by an elongated bolt 60 attached thereto and extending through a clearance hole in the mounting plate. The position of the block 55 is movably adjusted by a jack-screw 61 threadedly received in the plate 53. The plate 53 is bolted to the lower outer casing half 36b by a plurality of bolts 62.

In a similar manner, a pair of the above described roller structures 52 are provided for attachment to the lower outer casing half 36b in alignment with the peripheral flange 47.

As previously explained, the upper inner casing half 43a may be readily removed after the outer upper casing half 36b is removed.

The jack screws 61 are then screwed in radially inwardly direction to urge the rollers 56 into forcible abutment with the peripheral flange 48 and such jacking movement is continued until the flange 48 is lifted clear of abutment with the inner surface 63, so that the inner casing 43 is rollably supported by the rollers 56 and freely rotatable relative to the outer lower casing half 36b.

Since the inner casing is substantially balanced, only a small torque is now required to rotate the lower half of the inner casing 43b to the position occupied normally by the upper half of the inner casing 43a. This torque may, if desired, be applied applied by hand by the serviceman, and after the lower inner casing half is so positioned, it may be disassembled from the other half of the inner casing by removing the flange retaining bolts 45, and then lifted clear and removed entirely for service and required repair, as previously described.

The thus repaired inner casing lower half 43a and its nozzle blades may then be re-installed and returned to its original position by reversing the above procedure.

After installation, the roller structures 52 may be removed from the low outer casing half, if desired, and the apertures 51 covered by suitable cover plates (not shown) bolted to the outer casing by the same bolts 62.

The preferable and more precise manner of rolling the inner lower casing half 43b to the upper position, in view of its large inertia, is by employment of a pair of chain hoists 64A and 64B. The chain hoists are anchored to the opposing outer lower half casing flanges 38 by suitable eye-bolts 65 and connected to a suitable tab 66 on the upper inner casing half 43a. Then by manipulating the handle 67A of the hoist 64A and the handle 67B of the hoist 64B jointly and in a manner to pull up chain from the hoist 64A and let out chain from the hoist 64B (for example) the inner casing 43 may be rotated with a high degree of precision and control in clockwise direction 180° thereby to bring the lower inner casing half to the top, for removal.

Before disconnecting the two casing halves 43a and 43b from each other, they may be latched against unwanted rotational movement during removal of the flange engaging bolts 45 by employment of a pair of latch plates 68. The latch plates 68 are bolted to the outer casing flanges 38 by suitable bolts 69 and to the flange 48 of the lower inner casing half 43b, to thereby lock the two lower casing halves together. The upper inner casing half 43a may then be easily disassembled from the lower inner casing half for servicing without disturbing the rotor 24 and may be replaced and restored to its original position by reversing the above steps.

Figure 7:
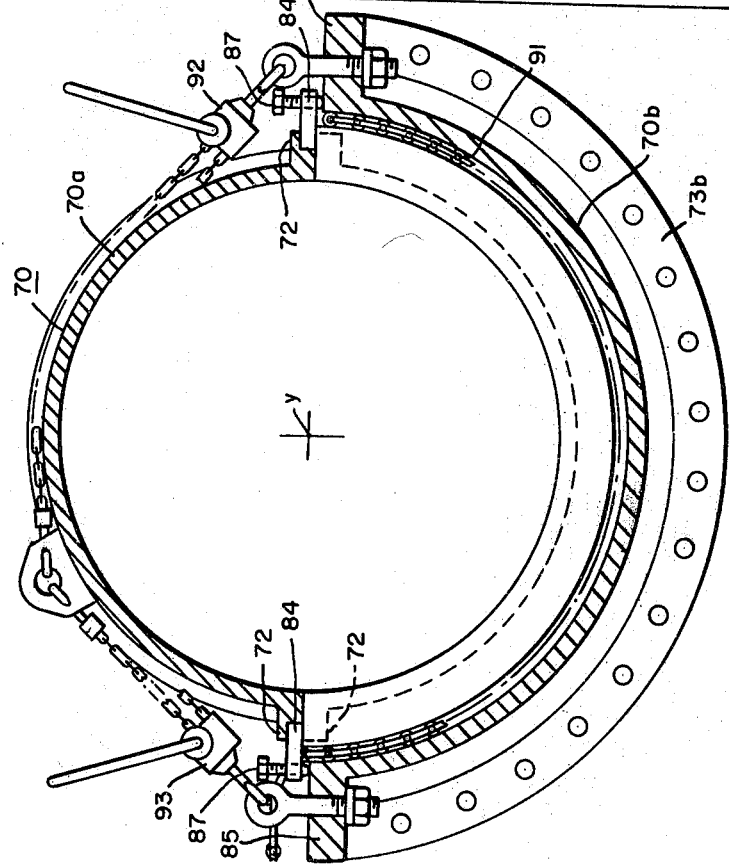
FIG. 7 is a transverse sectional view taken on line VII—VII of FIG. 6.

FIGS. 6 and 7 are views similar to FIGS. 3 and 4, respectively, showing a second embodiment of the invention. In this embodiment an inner turbine casing 70, divided into upper and lower halves 70a and 70b and joined to each other by horizontal flange structure 72, is disposed within an outer turbine casing divided into a lower half 73b and an identical upper half (not shown).

In this embodiment, however, the inner casing halves 70a and 70b are further divided into a plurality (four in the example shown) of blade ring structures 74, 75, 76 and 77 and each of the ring structures is arranged to receive one of the rows of stationary nozzle blades 41 (FIG. 2).

The ring structure 4 is provided with a pair of peripheral flanges 78 and 79. The flange 78, in normal operation, is disposed in supporting abutment with an inner annular rib 81 formed in the casing 73b and is provided with an annular recess 82. The flange 79, in normal operation, is disposed in supporting abutment with an annular recess 83 in the casing 73b.

The ring structure 74 is provided with a pair of diametrically opposed keys 84 clamped between the mating horizontal flanges 72. The keys 84, in turn, are supported on the horizontal flanges 85 of the outer lower casing half 73b and are effective to support the ring structure 74 in a central position with respect to the axis of the turbine rotor (not shown) and to prevent rotary displacement. The recess 83 in the lower outer casing 73b is effective to prevent axial translation of the ring structure 74.

The remaining ring structures 75, 76 and 77 are formed and supported in the same manner and need not be further described, except to point out that they are of increasing diameter from left to right to accommodate the larger nozzle blades employed in succeeding motive fluid expansion stages, as known in the art.

The ring structures 74, 75, 76 and 77 are disposed in transverse face-to-face sealing abutment with each other but are not joined to each other, therefore they are removable individually.

FIGS. 6 and 7 illustrate the ring structures in readiness for removal, with the ring structure 74 in readiness for removal before the others. Accordingly, each of the ring structures 74–77, inclusive, has been lifted vertically to a small degree by individual pairs of jack bolts 87, 88, 89 and 90. The jack bolts are received in threaded openings in the keys 84 and bear downwardly against the horizontal flanges 85 to lift their respective ring structures.

To remove the ring 74, after the jack screws 84 have been screwed down to the degree required to lift the flanges 78 and 79 out of abutment with the outer casing rib 81 and recess 83, a first length of roller chain 91 comprising a series of connected rollers (much like a bicycle sprocket chain) is then inserted into the annular space between the peripheral flange 79 and the annular recess 83 through the open end defined thereby at the horizontal flanges 72 and 85 of the inner and outer casings. A second length of roller chain 91 is then inserted into the annular space between the peripheral recess 82 and the lower outer casing rib 81, in a manner similar to the first chain. The two roller chains are fed through the entire lower half of the inner casing as shown in FIG. 2, and then the jack screws 87 are unscrewed from the keys 84, thereby lowering the inner ring structure 74 into supporting abutment with the two roller chains 91.

The keys 84 are then removed from the flanges 72, thereby rendering the ring structure 74 rollably supported by the two roller chains 91.

The ring structure 74 may then, as in the first embodiment, be rolled about the axis y manually without tools to bring the lower half of the ring structure 74 to a position above and out of the outer lower casing half 70b for removal. Preferably, such rolling may be accomplished by a pair of chain hoists 92 and 93, in the same manner as described in connection with the first embodiment. After repair, the lower half of the ring structure 74 may be repositioned in the lower outer casing half 70b by reversing the above procedure and removing the two roller chains 91. After the lower ring half is so positioned, the upper ring half may be placed in position and secured to the lower half and to the outer casing by the keys 84.

The other ring structures 75, 76 and 77 may be removed in the same manner as described in connection with the ring structure 74. The ring structures 74–77 may be rolled out, as above, in any desired order. Also, only those ring structures which require servicing need be removed with this embodiment. In such event, the jack screws 87, 88, 89 and 90 are only employed in connection with the ring structures that are to be removed.

Although the invention has been shown in several forms, it will be obvious to those skilled in the art that it is not so limited, but is susceptible of various other changes and modifications without departing from the spirit thereof.

What is claimed is:

1. A rotary machine comprising
   an inner casing structure having an outer peripheral surface portion of circular cross-section,
   an outer casing structure having an inner peripheral surface portion of circular cross-section,
   said inner casing being received in said outer casing with its outer surface portion in mating relation with the inner surface portion,
   said outer casing being divided into upper and lower halves removably joined to each other,
   said inner casing being divided into upper and lower halves removably joined to each other, and
   means effective to rollably support said inner casing in said outer casing.

2. The structure recited in claim 1, wherein
   the rollable support means is removably associated with the casing structure.

3. The structure recited in claim 2, wherein
   the lower half of the outer casing is provided with at least one aperture,
   the rollable support means comprises a rotatable member,
   means for rotatably supporting said rotatable member, and
   means for attaching said supporting means to the lower half of the outer casing with said rotatable member in registry with said aperture and in load supporting relation with the inner casing.

4. The structure recited in claim 3, and further including
   means for urging the rotatable member into load supporting relation with the outer surface portion of the inner casing structure.

5. The structure recited in claim 1, wherein
   the outer peripheral surface portion of the inner casing and the inner peripheral surface portion of the outer casing jointly define a peripheral groove, whereby when the upper half of the outer casing is removed from the lower half of the outer casing the groove is coextensive with the lower half of the casing structures and accessible from diametrically opposed open ends, and
   means for permitting insertion of the rollable supporting means in the groove through one of said open ends.

6. The structure recited in claim 5, wherein
   the means for permitting insertion of the rollable support means includes a pair of jack screws.

7. The structure recited in claim 1, wherein
   the outer peripheral surface portion of the inner casing and the inner peripheral surface portion of the outer casing jointly define a peripheral space, and the rollable supporting means comprises a series of rotatable members disposed in said peripheral space.

8. The structure recited in claim 7 wherein
the rotatable members are rollers and said rollers are connected to each other in a chain.

9. The structure recited in claim 1 and further including
a rotor disposed in the inner casing and encompassed thereby,
the upper half of the outer casing being removable to expose the inner casing, and
the inner casing being rotatable about the rotor on the rollably supporting means to permit removal of the lower half of the inner casing without removing said rotor.

10. The structure recited in claim 9 wherein
the lower half of the outer casing is provided with at least one aperture,
the rollable supporting means comprises a rotatable member,
means for rotatably supporting said rotatable member,
means for attaching said supporting means to the lower half of the outer casing with said rotatable member in registry with said aperture, and
means for urging said rotatable member into load supporting relation with the inner casing, thereby to render the inner casing freely rotatable relative to the outer casing.

11. An axial flow elastic fluid utilizing machine, comprising
an inner casing structure of annular shape and having an outer peripheral surface portion of circular cross-section;
said inner casing structure having a row of stationary blades received therein;
an outer casing structure having an inner peripheral surface portion of circular cross-section;
said inner casing being received in said outer casing with its outer surface portion in mating relation with said inner surface portion;
said outer casing being divided into upper and lower halves removably joined to each other;
said inner casing being divided into upper and lower halves removably joined to each other;
a rotor disposed in said inner casing and having a longitudinal rotational axis;
said rotor having an annular row of blades disposed about its periphery and operatively associated with the stationary blades of said inner casing structure; and
means effective to rollably support said inner casing in said outer casing for rotation about said longitudinal axis.

12. The structure recited in claim 11, wherein the rollable support means is removably asociated with the casing structure.

13. The structure recited in claim 12, wherein
the lower half of the outer casing is provided with at least one aperture;
the rollable support means comprises a rotatable member;
means for rotatably supporting said rotatable member; and
means for attaching said supporting means to the lower half of the outer casing with said rotatable member in registry with said aperture.

14. The structure recited in claim 13, and further including
means for moving the rotatable member into and out of load supporting relation with the inner casing.

15. The structure recited in claim 1, wherein
the outer peripheral surface portion of the inner casing and the inner peripheral surface portion of the outer casing jointly define a peripheral groove, whereby when the upper half of the outer casing is removed from the lower half of the outer casing the groove is coextensive with the lower halves of the casing structures and accessible from diametrically opposed ends; and
means for permitting insertion of the rollable support means in the groove through at least one of said open ends.

16. The structure recited in claim 15, wherein
the inner and outer casings are provided with flanges for joining their respective upper and lower halves; and
the means for permitting insertion of the rollable support means includes a pair of jack screws for lifting and lowering the inner casing relative to the lower half of the outer casing.

17. The structure recited in claim 16, wherein
the rollable supporting means comprises a series of rotatable members disposed in the groove.

References Cited

UNITED STATES PATENTS

| 1,067,356 | 7/1913 | Ljungström. |
| 2,199,595 | 5/1940 | Millard. |
| 2,638,743 | 5/1953 | Feilden. |
| 3,066,850 | 12/1962 | Coron et al. |
| 3,181,232 | 5/1965 | Challender. |

FOREIGN PATENTS

| 1,182,175 | 1/1959 | France. |
| 815,032 | 6/1959 | Great Britain. |

EVERETTE A. POWELL, Jr., Primary Examiner

U.S. Cl. X.R.

230—132